Figure 1:
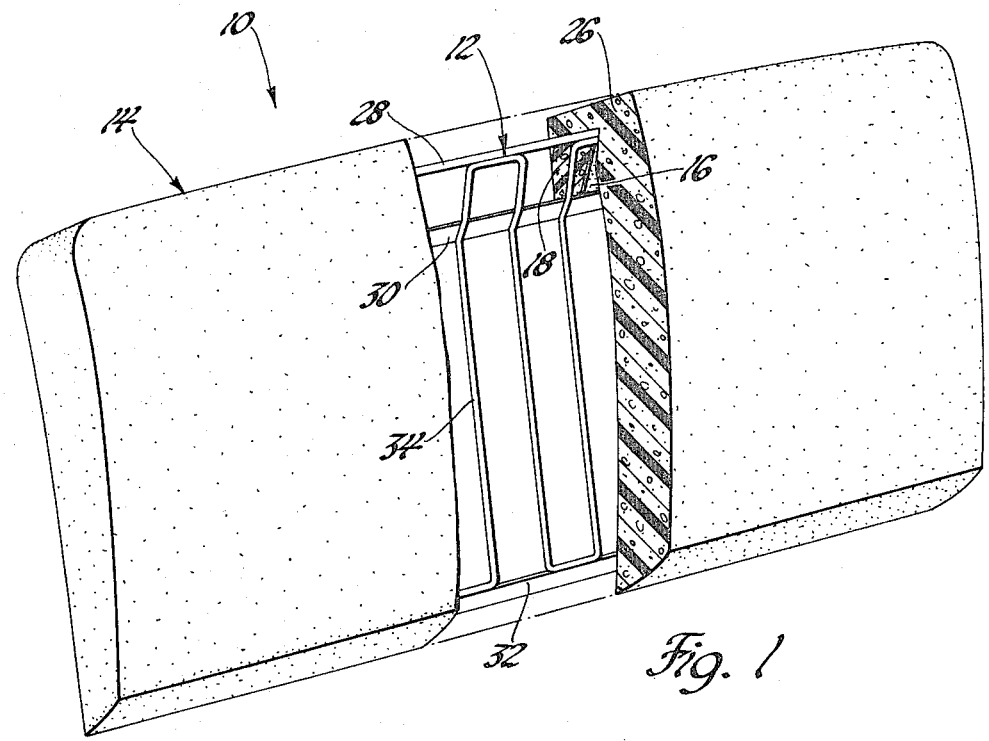

United States Patent [19]
Fruchte

[11] 3,800,343
[45] Apr. 2, 1974

[54] VEHICLE SEAT
[75] Inventor: Donald R. Fruchte, Trotwood, Ohio
[73] Assignee: General Motors Corporation, Detroit, Mich.
[22] Filed: Dec. 15, 1971
[21] Appl. No.: 208,368

[52] U.S. Cl............. 5/351, 297/452, 297/DIG. 2
[51] Int. Cl............................................. A47c 23/00
[58] Field of Search.... 5/345, 351, 355, 361, 361 B, 5/246, 260; 264/45, 51; 297/452, DIG. 2

[56] References Cited
UNITED STATES PATENTS
| | | | |
|---|---|---|---|
| 3,534,129 | 10/1970 | Bartel | 264/45 |
| 3,657,403 | 4/1972 | Olson | 264/51 |
| 3,116,196 | 12/1963 | Terry | 5/351 X |
| 3,251,909 | 5/1966 | Pickands et al. | 264/338 X |

*Primary Examiner*—Bobby R. Gay
*Assistant Examiner*—Andrew M. Calvert
*Attorney, Agent, or Firm*—Herbert Furman

[57] ABSTRACT

A vehicle seat includes a premolded urethane member having a plastic release material on a portion thereof and a second urethane member molded about the premolded member to form a seat cushion. The release material extends to the surface of the seat cushion and prevents cohesion of the second member to the premolded member so that those areas of the members separated by the release material define the walls of a pocket into which the seat frame is inserted for attaching the cushion to the frame.

1 Claim, 2 Drawing Figures

PATENTED APR 2 1974　　　　　　　　　　　　　　3,800,343

VEHICLE SEAT

The invention relates to vehicle seat construction and more particularly to a seat including a foam seat cushion having an integrally molded pocket into which a seat frame member is inserted for attaching the cushion to the frame.

It is known to provide urethane foam cushions which may be attached to a rigid frame to provide a vehicle seat structure. It is also known to place a plastic release film over a preselected area of a molded urethane member and to mold a second urethane member about the first member so that the members are cohesively bound together except in those areas covered by the film.

One feature of the invention is a molded seat cushion having a pocket in which a rigid seat frame may be received to secure the cushion to the seat frame without conventional fastening devices. Another feature of the invention is a vehicle seat structure including a foam pad having integrally molded first and second members with a release film positioned along a portion of the interface therebetween to provide a slot or pocket for the insertion of a seat frame.

According to the invention, a seat cushion is provided by molding a second urethane cushion member about a premolded urethane member having a plastic release-type material coating a portion thereof. The second and premolded members are cohesively bound together to provide an integral seat cushion. There is no cohesion between the second member and the premolded member in the area of the release material so that a slot or pocket is provided in the seat cushion into which a seat frame may be inserted for securing the cushion to the frame.

Figure 2:
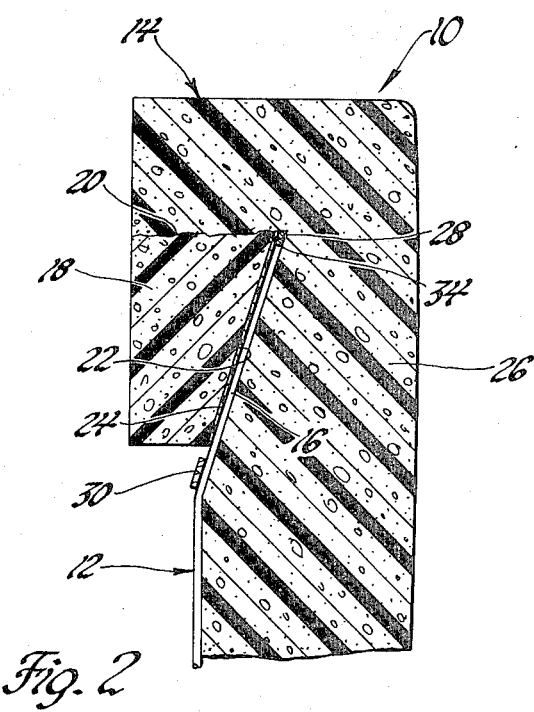

IN THE DRAWINGS:

FIG. 1 is a perspective view of a seat cushion and frame according to the invention and having parts broken away and in section; and FIG. 2 is an enlarged fragmentary view of FIG. 1.

Referring to FIG. 1, a vehicle seat generally indicated at 10 includes a seat frame 12 and a resilient foam cushion 14. The resilient foam cushion 14 is mounted on the frame 12 by the insertion of a portion of the frame 12 within a pocket or slot 16 formed in the resilient cushion 14.

Referring to FIG. 2, the resilient foam cushion 14 includes a premolded urethane member 18 having surfaces 20 and 22. A release-type material 24, for example, polyvinyl chloride film, covers the surface 22 of the premolded urethane member 18. A second urethane member 26 is molded about the premolded urethane member 18 in contact with both surface 20 thereof and the plastic release material 24 covering surface 22 thereof. The second urethane member 26 is cohesively bound to the surface 20 of premolded urethane member 18. The binding or knitting of member 26 to member 18 may be improved by sawing or cutting along surface 20 to open the cell structure of member 18 so that the member 26 can enter the cell structure of member 18. The plastic release material 24 prevents the second urethane member 26 from being bound to surface 22 of premolded urethane member 18. It is important to note that the release material 24 covering surface 22 extends to the edge of premolded member 18 and the surface of the finished cushion 14. Thus it may be seen the finished cushion 14 may be spread apart in the area of the plastic release material 24 to provide access to the slot or pocket 16.

The seat frame 12 of FIG. 1 includes spaced bars 28, 30, and 32 which are joined at their respective ends by additional bars (not shown) to form a rectangular frame. A sinuously wound wire 34 is welded in connection between the bars. It may be seen, as shown in FIG. 1, that the resilient foam cushion 14 is placed over the frame 12 with the frame located in the pocket 16 provided between premolded member 18 and the second urethane member 26 of the cushion. It is apparent that a slot 16 may be provided on one or more sides of the cushion as may be advantageous for a particular application of the invention.

Thus it may be seen that an improved seat structure is provided wherein a resilient foam cushion may be attached to a frame member without the use of conventional fasteners.

I claim:

1. In a vehicle seat structure having a frame and a resilient seat cushion, the improvement comprising: a seat cushion including first and second resilient molded members molded together and having juxtaposed generally planar surfaces terminating at the face of the seat cushion, a plastic release film between the generally planar surfaces of the resilient molded members and extending from the face of the seat cushion for a substantial depth into the seat cushion for preventing cohesion between the generally planar surfaces of the first and second resilient molded members, the first and second resilient molded members being forcibly spread apart along the release film so that the release film and the generally planar surface of one of the resilient molded members cooperate to define a pocket in the seat cushion between the first and second resilient molded members, the frame having an edge portion thereof received in the pocket of the seat cushion and captured therein by the resilience of the first and second resilient molded members to secure the seat cushion to the frame.

* * * * *